(12) United States Patent
Fang et al.

(10) Patent No.: US 11,765,742 B2
(45) Date of Patent: Sep. 19, 2023

(54) METHOD AND DEVICE FOR RESOURCE ALLOCATION

(71) Applicant: ZTE Corporation, Guangdong (CN)

(72) Inventors: Huiying Fang, Guangdong (CN); Weiwei Yang, Guangdong (CN); Bo Dai, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/662,417

(22) Filed: May 6, 2022

(65) Prior Publication Data

US 2022/0264543 A1 Aug. 18, 2022

Related U.S. Application Data

(63) Continuation of application No. 16/367,112, filed on Mar. 27, 2019, now Pat. No. 11,356,990, which is a
(Continued)

(30) Foreign Application Priority Data

Sep. 27, 2016 (CN) .......................... 201610855034.8

(51) Int. Cl.
*H04W 72/0453* (2023.01)
*H04W 72/23* (2023.01)
(Continued)

(52) U.S. Cl.
CPC ........... *H04W 72/23* (2023.01); *H04L 1/1614* (2013.01); *H04W 4/80* (2018.02); *H04W 72/0453* (2013.01)

(58) Field of Classification Search
None
See application file for complete search history.

(56) References Cited

U.S. PATENT DOCUMENTS

2013/0322363 A1 12/2013 Chen et al.
2018/0049176 A1* 2/2018 Park ..................... H04L 5/0092
(Continued)

FOREIGN PATENT DOCUMENTS

CN 101242662 A 8/2008
CN 103220795 A 7/2013
(Continued)

OTHER PUBLICATIONS

Mediatek Inc., "Considerations on PUSCH for LAA," 3GPP TSG RAN WG1 Meeting #84, R1-160972, 2016, 5 pages.
(Continued)

*Primary Examiner* — Jenkey Van
(74) *Attorney, Agent, or Firm* — Perkins Coie LLP

(57) ABSTRACT

The present invention provides a resource allocation method and device. The method includes: sending, by a base station, a resource allocation parameter to a terminal, where the resource allocation parameter includes a starting narrowband index and a resource position, where the starting narrowband index is used for indicating a narrowband resource and/or a wideband resource for the terminal to establish a physical shared channel. The embodiments of the present invention solve the problem in existing art that resource allocation for physical downlink shared channel (PDSCH)/physical uplink shared channel (PUSCH) only considers a bandwidth limitation of a 1.4 MHz narrowband so that a user equipment (UE) cannot support machine type communications (MTC) applications with a higher data rate, achieving an effect of being capable of supporting MTC traffic with a higher data rate.

20 Claims, 5 Drawing Sheets

A base station sends a resource allocation parameter to a terminal, where the resource allocation parameter includes a starting narrowband index and a resource position, and the starting narrowband index is used for indicating a narrowband resource and/or a wideband resource for the terminal to establish a physical shared channel — S102

Related U.S. Application Data continuation of application No. PCT/CN2017/101911, filed on Sep. 15, 2017.

(51) Int. Cl.
*H04W 4/80* (2018.01)
*H04L 1/1607* (2023.01)

(56) References Cited

U.S. PATENT DOCUMENTS

| | | | | |
|---|---|---|---|---|
| 2018/0049201 | A1* | 2/2018 | Hussain | H04W 72/042 |
| 2018/0069593 | A1 | 3/2018 | Yi | |
| 2018/0102890 | A1* | 4/2018 | Yi | H04L 5/0053 |
| 2019/0174283 | A1 | 6/2019 | Awad | |
| 2019/0191428 | A1* | 6/2019 | Yan | H04W 72/0406 |
| 2020/0383113 | A1* | 12/2020 | Yang | H04W 72/0446 |

FOREIGN PATENT DOCUMENTS

| | | |
|---|---|---|
| CN | 103581841 A | 2/2014 |
| EP | 3479631 A1 | 5/2019 |

OTHER PUBLICATIONS

NEC, "PDSCH/PUSCH Resource allocation schemes for Rel-13 MTC," 3GPP TSG RAN WG1 Meeting #82bis, R1-155291, 2015, 4 pages.

NEC, "PDSCH/PUSCH Resource allocation schemes for Rel-13 MTC," 3GPP TSG RAN WG1 Meeting #83, R1-156684, 2015, 4 pages.

State Intellectual Property Office of the P.R. China, International Search Report and Written Opinion dated Dec. 4, 2017 for PCT/CN2017/101911, 13 pages.

State Intellectual Property Office of the P.R. China, Office Action dated Feb. 3, 2020 for Chinese Patent Application No. 201610855034.8, 17 pages with English translation.

State Intellectual Property Office of the P.R. China, Office Action dated May 6, 2020 for Chinese Patent Application No. 201610855034.8, 5 pages with English translation.

State Intellectual Property Office of the P.R. China, Office Action dated Jul. 24, 2020 for Chinese Patent Application No. 201610855034.8, 17 pages with English translation.

Status Report to TSG, 3GPP TSG RAN meeting #73, RP-161462, 2016, 7 pages.

ZTE, "Support of larger TBS and larger PDSCH/PUSCH bandwidth for MTC," 3GPP TSG RAN WG1 Meeting #86, R1-167319, 2016, 8 pages.

MCC Support, "Final Report of 3GPP TSG RAN WG1 #82bis v1.0.0 (Malmo, Sweden, Oct. 5-9, 2015)," R1-156401, 3GPP TSG RAN WG1 Meeting #83, Anaheim, USA, Nov. 15-22, 2015, Retrieved from the Internet: URL:http://www.3gpp.org/ftp/tsg_ran/WG1_RL1/TSGR1_83/Docs [Retrieved on Nov. 12, 2015], 112 pages.

Panasonic, "Resource allocation of PDSCH/PUSCH for Rel.13 MTC," R1-153967, 3GPP TSG RAN WG1 Meeting #82, Beijing, China, Aug. 24-28, 2015, Retrieved from the Internet: URL:http://www.3gpp.org/ftp/tsg_ran/WG1_RL1/TSGR1_82/Docs [Retrieved on Aug. 14, 2015], 3 pages.

Supplementary European Search Report for European Patent No. 17854701, dated Sep. 18, 2020, 3 pages.

EPO, Communication pursuant to Article 94(3) EPC for European Application No. 17854701.4, dated Nov. 10, 2022. 7 pages.

* cited by examiner

A base station sends a resource allocation parameter to a terminal, where the resource allocation parameter includes a starting narrowband index and a resource position, and the starting narrowband index is used for indicating a narrowband resource and/or a wideband resource for the terminal to establish a physical shared channel — S102

FIG. 1

A terminal receives a resource allocation parameter, where the resource allocation parameter includes a starting narrowband index and a resource position, and the starting narrowband index is used for indicating a narrowband resource and/or a wideband resource for establishing a physical shared channel — 202

The terminal establishes the physical shared channel according to at least the starting narrowband index and the resource position — 204

FIG. 2

Sending module 30

Resource allocation device

FIG. 3

METHOD AND DEVICE FOR RESOURCE ALLOCATION

CROSS REFERENCE TO RELATED APPLICATIONS

This patent document is a continuation of U.S. patent application Ser. No. 16/367,112, filed on Mar. 27, 2019, now U.S. Pat. No. 11,356,990, which is a continuation of and claims priority to International Patent Application No. PCT/CN2017/101911, filed on Sep. 15, 2017, which claims the benefit of priority of Chinese Patent Application No. 201610855034.8, filed on Sep. 27, 2016. The entire contents of the before-mentioned patent applications are incorporated by reference as part of the disclosure of this document.

TECHNICAL FIELD

The present invention relates to the field of communications and, in particular, to a resource allocation method and device.

BACKGROUND

Machine Type Communications (MTC), also referred to as Machine to Machine (M2M), is the primary application mode of the Internet of Things in the current stage. Currently, MTC devices in the market are mainly based on the global system of mobile communication (GSM). In recent years, more and more mobile operators have chosen Long Term Evolution/Advanced Long-Term Evolution (LTE/LTE-A) as the evolution direction of the future wideband wireless communication system due to the high spectral efficiency of the LTE/LTE-A. Various MTC data traffic based on the LTE/LTE-A will also be more attractive.

Since the MTC terminal in existing art supports a narrowband with the maximum bandwidth of 1.4 MHz, to support MTC applications with a higher data rate, the user equipment (UE) needs to support new functions. One of them is to support a larger physical downlink shared channel (PDSCH)/physical uplink shared channel (PUSCH) bandwidth. The resource allocation of the PDSCH/PUSCH in existing art is designed with consideration of a bandwidth limitation of the 1.4 MHz narrowband so that the UE cannot support the MTC applications with the higher data rate. Currently the maximum channel bandwidth of the PDSCH/PUSCH is required to reach 5 MHz and the resource allocation is not enough in this case.

In view of the above problem in existing art, no effective solution has yet been proposed.

SUMMARY

Embodiments of the present invention provide a resource allocation method and device to solve at least the problem in existing art that resource allocation for PDSCH/PUSCH only considers a bandwidth limitation of a 1.4 MHz narrowband so that UE cannot support an MTC application with a higher data rate.

An embodiment of the present invention provides a resource allocation method. The method includes that a base station sends a resource allocation parameter to a terminal. The resource allocation parameter includes a starting narrowband index and a resource position. The starting narrowband index is used for indicating a narrowband resource and/or a wideband resource for the terminal to establish a physical shared channel.

Optionally, the resource allocation parameter further includes bandwidth indication information. The bandwidth indication information is used for indicating bandwidth information of the resource position.

Optionally, when the bandwidth indication information has 1 bit, the bandwidth indication information indicates whether the resource position is a wideband or a narrowband, and when the bandwidth indication information has 2 bits, the bandwidth indication information indicates the number of narrowbands included in a bandwidth of the resource position.

Optionally, the wideband includes M narrowbands, where M is an integer greater than or equal to 2 and less than or equal to 16; and the narrowband includes at least 6 continuous physical resource blocks (PRBs).

Optionally, a maximum channel bandwidth supported by the physical shared channel includes one of 5 MHz, 10 MHz and 20 MHz.

Optionally, when the wideband has a bandwidth of 5 MHz, the wideband includes 24 or 25 PRBs.

Optionally, the starting narrowband index is used for one of the followings: indicating starting position information of the resource position; identifying a wideband index of a wideband, where the wideband includes a starting narrowband and the starting narrowband has a minimum index among narrowbands within the wideband; and identifying a narrowband index.

Optionally, in a case where the resource allocation parameter includes the bandwidth indication information and the starting narrowband index, when the bandwidth indication information indicates that resource allocation is currently performed in a wideband mode, the starting narrowband index is used for identifying a wideband in which an starting narrowband is located; and when the bandwidth indication information indicates that the resource allocation is currently performed in a narrowband mode, the starting narrowband index is used for identifying a current narrowband.

Optionally, the step in which the base station sends the resource allocation parameter to the terminal includes that the base station sends the resource allocation parameter to the terminal through higher-layer signaling and/or downlink control information (DCI).

Optionally, the step in which the base station sends the resource allocation parameter to the terminal through the higher-layer signaling and/or the DCI includes that the base station sends the starting narrowband index and/or bandwidth indication information to the terminal through the higher-layer signaling and/or the DCI; and that the base station sends the resource position within a wideband or a narrowband to the terminal through the DCI.

Optionally, resource granularity indicating the resource position within a wideband is one of: 1 PRB, 2 PRBs, 3 PRBs, 4 PRBs and 6 PRBs.

Optionally, the resource position is directly indicated by a specific resource indication field, or jointly indicated by a resource allocation manner indication field and the specific resource indication field.

In response to that the resource position is indicated by the specific resource indication field, a resource allocation manner corresponding to the specific resource indication field is pre-defined or fixed or semi-statically configured.

In response to that the resource position is jointly indicated by the resource allocation manner indication field and the specific resource indication field, the resource allocation manner corresponding to the specific resource indication field is determined by the resource allocation manner indication field.

Optionally, the starting narrowband index, the resource position and/or the bandwidth indication information are independently encoded.

Optionally, the starting narrowband index and the bandwidth indication information are jointly encoded and the resource position is independently encoded.

Optionally, the starting narrowband index, the resource position and/or the bandwidth indication information are jointly encoded with a bitmap of length N.

Optionally, when the starting narrowband index is independently encoded, the starting narrowband index is sent through information of fixed or variable length.

Optionally, when the starting narrowband index is sent through information of fixed length, the starting narrowband index is sent using an information field of a length with a maximum value of 4.

Optionally, when the starting narrowband index is sent through information of variable length, the following is included:

for a system bandwidth greater than or equal to 5 MHz, when the starting narrowband index is used for identifying starting position information of a wideband with a bandwidth equal to 5 MHz, the starting narrowband index requires x bits:

$$x = \left\lceil \log_2\left( \left\lfloor \frac{N_{RB}^{DL}}{6} \right\rfloor - 3 \right) \right\rceil;$$

or for the system bandwidth greater than or equal to 5 MHz, when the starting narrowband index is used for identifying a narrowband position or starting position information of a wideband with a bandwidth less than 5 MHz or starting position information of a wideband with a bandwidth equal to 5 MHz, the starting narrowband index requires y bits:

$$y = \left\lceil \log_2\left( \left\lfloor \frac{N_{RB}^{DL}}{6} \right\rfloor \right) \right\rceil;$$

or for the system bandwidth greater than or equal to 5 MHz, if the starting narrowband index is used for identifying starting position information of a wideband with a bandwidth greater than 5 MHz, the starting narrowband index requires z bits, where z<x;

where $N_{RB}^{DL}$ is the number of downlink physical resource blocks (PRBs) corresponding to the system bandwidth.

An embodiment of the present invention provides another resource allocation method. The method includes that a terminal receives a resource allocation parameter. The resource allocation parameter includes a starting narrowband index and a resource position. The starting narrowband index is used for indicating a narrowband resource and/or a wideband resource for establishing a physical shared channel.

Optionally, the resource allocation parameter further includes bandwidth indication information. The bandwidth indication information is used for indicating bandwidth information of the resource position.

Optionally, when the bandwidth indication information has 1 bit, the bandwidth indication information indicates whether the resource position is a wideband or a narrowband, and when the bandwidth indication information has 2 bits, the bandwidth indication information indicates the number of narrowbands included in a bandwidth of the resource position.

Optionally, the wideband includes M narrowbands, where M is an integer greater than or equal to 2 and less than or equal to 16; and the narrowband includes at least six continuous physical resource blocks (PRBs).

Optionally, a maximum channel bandwidth supported by the physical shared channel includes one of 5 MHz, 10 MHz and 20 MHz.

Optionally, when the wideband has a bandwidth of 5 MHz, the wideband includes 24 or 25 PRBs.

Optionally, the starting narrowband index is used for one of the followings: indicating starting position information of the resource position; identifying a wideband index of a wideband, where the wideband includes a staring narrowband and the starting narrowband has a minimum index among narrowbands within the wideband; and identifying a narrowband index.

Another embodiment of the present invention provides a resource allocation device, applied to a base station. The device includes a sending module, which is configured to send a resource allocation parameter to an MTC terminal via signaling. The resource allocation parameter includes a starting narrowband index and a resource position. The starting narrowband index is used for indicating a narrowband resource and/or a wideband resource for the terminal to establish a physical shared channel.

Optionally, the resource allocation parameter further includes bandwidth indication information. The bandwidth indication information is used for indicating bandwidth information of the resource position.

Optionally, when the bandwidth indication information has 1 bit, the bandwidth indication information indicates whether the resource position is a wideband or a narrowband, and when the bandwidth indication information has 2 bits, the bandwidth indication information indicates the number of narrowbands included in a bandwidth of the resource position.

Optionally, the starting narrowband index is used for one of the followings: indicating starting position information of the resource position; identifying a wideband index of a wideband, where the wideband includes a staring narrowband and the starting narrowband has a minimum index among narrowbands within the wideband; and identifying a narrowband index.

Another embodiment of the present invention provides another resource allocation device, applied to a terminal. The device includes a receiving module, which is configured to receive a resource allocation parameter. The resource allocation parameter includes a starting narrowband index and a resource position. The starting narrowband index is used for indicating a narrowband resource and/or a wideband resource for establishing a physical shared channel.

Optionally, the resource allocation parameter further includes bandwidth indication information. The bandwidth indication information is used for indicating bandwidth information of the resource position.

Optionally, when the bandwidth indication information has 1 bit, the bandwidth indication information indicates whether the resource position is a wideband or a narrowband, and when the bandwidth indication information has 2 bits, the bandwidth indication information indicates the number of narrowbands included in a bandwidth of the resource position.

Optionally, the wideband includes M narrowbands, where M is an integer greater than or equal to 2 and less than or equal to 16; and the narrowband includes at least six continuous physical resource blocks (PRBs).

Optionally, a maximum channel bandwidth supported by the physical shared channel includes one of 5 MHz, 10 MHz and 20 MHz.

Optionally, when the wideband has a bandwidth of 5 MHz, the wideband includes 24 or 25 PRBs.

Optionally, the starting narrowband index is used for one of the followings: indicating starting position information of the resource position; identifying a wideband index of a wideband, where the wideband includes a staring narrowband and the starting narrowband has a minimum index among narrowbands within the wideband; and identifying a narrowband index.

Another embodiment of the present invention provides a storage medium. The storage medium is configured to store program codes for executing the step described below.

A resource allocation parameter is sent to a terminal via signaling. The resource allocation parameter includes a starting narrowband index and a resource position. The starting narrowband index is used for indicating a narrowband resource and/or a wideband resource for the terminal to establish a physical shared channel.

In the present invention, the base station configures a resource for transmission of the physical shared channel of the terminal through the resource allocation parameter and sends the resource allocation parameter to the terminal, thereby solving the problem in existing art that the resource allocation of the PDSCH/PUSCH only considers the bandwidth limitation of the 1.4 MHz narrowband so that the UE cannot support the MTC applications with the higher data rate and achieves the effect of being capable of supporting the MTC traffic with the higher data rate.

BRIEF DESCRIPTION OF DRAWINGS

The drawings described herein are used to provide a further understanding of the present invention and form a part of the present application. The exemplary embodiments and descriptions thereof in the present invention are used to explain the present invention and not to limit the present invention in any improper way. In the drawings:

FIG. 1 is a flowchart of a resource allocation method according to an embodiment of the present invention;

FIG. 2 is a flowchart of another resource allocation method according to an embodiment of the present invention;

FIG. 3 is a structural diagram of a resource allocation device according to an embodiment of the present invention;

DETAILED DESCRIPTION

Figure 4:
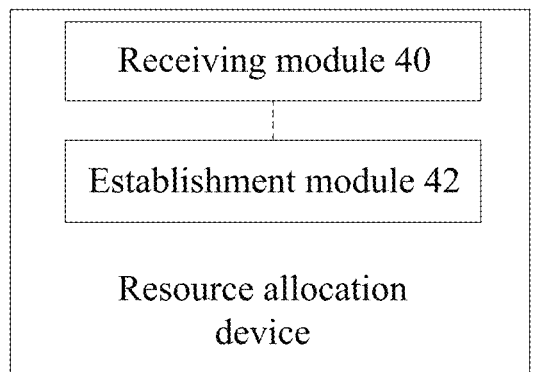
FIG. 4 is a structural diagram of another resource allocation device according to an embodiment of the present invention.

Hereinafter the present invention will be described in detail with reference to the drawings in conjunction with embodiments. It is to be noted that if not in collision, the embodiments and features therein in the present application may be combined with each other.

It is to be noted that the terms "first", "second" and the like in the description, claims and drawings of the present invention are used to distinguish between similar objects and are not necessarily used to describe a particular order or sequence.

Embodiment 1

The embodiment provides a resource allocation method. FIG. 1 is a flowchart of a resource allocation method according to an embodiment of the present invention. As shown in FIG. 1, the method includes the step described below.

In step S102, a base station sends a resource allocation parameter to a terminal, where the resource allocation parameter includes a starting narrowband index and a resource position, and the starting narrowband index is used for indicating a narrowband resource and/or a wideband resource for the terminal to establish a physical shared channel.

Optionally, before the step S102 in which the base station sends the resource allocation parameter to the terminal, the method may further include step S104 in which the base station receives a request message from the terminal. The request message is used for requesting the base station to allocate the resource allocation parameter to the terminal.

In the above steps, the base station configures a resource for transmission of the physical shared channel of the terminal through the resource allocation parameter and sends the resource allocation parameter to the terminal, thereby solving the problem in existing art that resource allocation for PDSCH/PUSCH only considers a bandwidth limitation of a 1.4 MHz narrowband so that a UE cannot support MTC applications with a higher data rate and achieving an effect of being capable of supporting MTC traffic with a higher data rate.

Optionally, the above steps may be executed by the base station, but it is not limited thereto. The terminal in the embodiment may, but may not necessarily, be an MTC terminal.

Optionally, the resource allocation parameter further includes bandwidth indication information. The bandwidth indication information is used for indicating bandwidth information of the resource position.

Optionally, the bandwidth indication information identifies the bandwidth information of the resource position and includes one of the characteristics described below.

When the bandwidth indication information has 1 bit, the bandwidth indication information indicates whether the resource position is a wideband or a narrowband.

When the bandwidth indication information has 2 bits, the bandwidth indication information indicates the number of narrowbands included in a bandwidth of the resource position.

The wideband includes M narrowbands. M is an integer greater than or equal to 2 and less than or equal to 16. The narrowband includes six continuous physical resource blocks (PRBs). A maximum channel bandwidth supported by a PDSCH/PUSCH includes, but is not limited to, 5 MHz, 10 MHz or 20 MHz.

Optionally, when the wideband has a bandwidth of 5 MHz, the wideband includes 24 or 25 physical resource blocks (PRBs).

Optionally, the starting narrowband index is used for identifying one of the following information:

The starting narrowband index indicates starting position information of the resource position. The starting narrowband index is used for identifying a wideband index of the wideband. Specifically, the wideband includes a staring narrowband and the starting narrowband has a minimum index among narrowbands within the wideband. The starting narrowband index identifies a narrowband index.

Optionally, when the resource allocation parameter includes the bandwidth indication information and the bandwidth indication information indicates that resource allocation is currently performed in the wideband mode, the starting narrowband index is used for identifying a wideband in which the starting narrowband is located; and when the bandwidth indication information indicates that the resource allocation is currently performed in a narrowband mode, the starting narrowband index only identifies a current narrowband.

Optionally, a step in which the base station sends the resource allocation parameter to the terminal via signaling includes that the base station sends the resource allocation parameter to the terminal through higher-layer signaling and/or downlink control information (DCI).

Optionally, the step in which the base station sends the resource allocation parameter to the terminal through the higher-layer signaling and/or the DCI includes that the base station sends the starting narrowband index to the terminal through the higher-layer signaling and/or the DCI.

Optionally, the step in which the base station sends the resource allocation parameter to the terminal through the higher-layer signaling and/or the DCI includes that the base station sends the bandwidth indication information to the terminal through the higher-layer signaling and/or the DCI.

Optionally, the step in which the base station sends the resource allocation parameter to the terminal through the higher-layer signaling and/or the DCI includes that the base station sends the resource position within the wideband or the narrowband to the terminal through the DCI.

Optionally, resource granularity indicating the resource position within the wideband may be the same as or different from resource granularity indicating the resource position within the narrowband.

Optionally, the resource granularity indicating the resource position within the wideband is at least one of: 1 PRB, 2 PRBs, 3 PRBs, 4 PRBs and 6 PRBs.

Furthermore, the resource position may be directly indicated by a specific resource indication field, or jointly indicated by a resource allocation manner indication field and the specific resource indication field.

In response to that the resource position is indicated by the specific resource indication field, a resource allocation manner corresponding to the specific resource indication field is pre-defined or fixed or semi-statically configured.

In response to that the resource position is jointly indicated by the resource allocation manner indication field and the specific resource indication field, the resource allocation manner corresponding to the specific resource indication field is determined by the resource allocation manner indication field.

Optionally, the starting narrowband index, the bandwidth indication information and the resource position are independently encoded and separately indicated. The starting narrowband index and the bandwidth indication information are jointly encoded and the resource position is independently encoded. The starting narrowband index, the bandwidth indication information and the resource position are jointly encoded with a bitmap of length N.

Furthermore, if the starting narrowband index is independently encoded, the starting narrowband index is sent through information of fixed or variable length. If the starting narrowband index is sent through information of fixed length, an information field has a length with a maximum value of 4.

Optionally, when the starting narrowband index is sent through information of variable length, three cases are specifically included.

In a first case, for a system bandwidth greater than or equal to 5 MHz, when the starting narrowband index is used for identifying starting position information of a wideband with a bandwidth equal to 5 MHz, the starting narrowband index requires x bits:

$$x = \left\lceil \log_2\left(\left\lfloor \frac{N_{RB}^{DL}}{6} \right\rfloor - 3\right)\right\rceil N_{RB}^{DL}$$

$$y = \left\lceil \log_2\left(\left\lfloor \frac{N_{RB}^{DL}}{6} \right\rfloor\right)\right\rceil$$

In a third case, for the system bandwidth greater than or equal to 5 MHz, if the starting narrowband index is used for identifying starting position information of a wideband with a bandwidth greater than 5 MHz, the starting narrowband index requires z bits, where z<x.

The embodiment provides another resource allocation method. FIG. 2 is a flowchart of another resource allocation method according to an embodiment of the present invention. As shown in FIG. 2, the method includes the step described below.

In step S202, a terminal receives a resource allocation parameter, where the resource allocation parameter includes a starting narrowband index and a resource position, and the starting narrowband index is used for indicating a narrowband resource and/or a wideband resource for establishing a physical shared channel.

Optionally, the method further includes step S204 in which the terminal receives or sends the physical shared channel on PRBs determined by the resource allocation parameter. The terminal receives a downlink shared channel on the PRBs determined by the resource allocation parameter, and the terminal sends an uplink shared channel on the PRBs determined by the resource allocation parameter.

Optionally, the resource allocation parameter further includes bandwidth indication information. The bandwidth indication information is used for indicating bandwidth information of the resource position.

Optionally, when the bandwidth indication information has 1 bit, the bandwidth indication information indicates whether the resource position is a wideband or a narrowband, and when the bandwidth indication information has 2 bits, the bandwidth indication information indicates the number of narrowbands included in a bandwidth of the resource position.

Optionally, the wideband includes M narrowbands, where M is an integer greater than or equal to 2 and less than or equal to 16; and the narrowband includes at least six continuous physical resource blocks (PRBs).

Optionally, a maximum channel bandwidth supported by the physical shared channel includes one of 5 MHz, 10 MHz and 20 MHz.

Optionally, when the wideband has a bandwidth of 5 MHz, the wideband includes 24 or 25 PRBs.

Optionally, the starting narrowband index is specifically used for one of the followings: indicating starting position information of the resource position; identifying a wideband index of the wideband, where the wideband includes a staring narrowband and the starting narrowband has a minimum index among narrowbands within the wideband; identifying a narrowband index.

From the description of the embodiment described above, it will be apparent to those skilled in the art that the methods in the embodiment described above may be implemented by software plus a necessary general-purpose hardware platform, or may of course be implemented by hardware. However, in many cases, the former is a preferred implementation mode. Based on this understanding, the solutions provided by the present invention substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the methods according to each embodiment of the present invention.

Embodiment 2

The embodiment provides a resource allocation device configured to implement the above-mentioned embodiments and preferred implementation modes. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

FIG. 3 is a structural diagram of a resource allocation device according to an embodiment of the present invention, applied to a base station. As shown in FIG. 3, the device includes a sending module 30.

The sending module 30 is configured to send a resource allocation parameter to a terminal via signaling, where the resource allocation parameter includes a starting narrowband index and a resource position, and the starting narrowband index is used for indicating a narrowband resource and/or a wideband resource for the terminal to establish a physical shared channel.

Optionally, the device further includes a receiving module. The receiving module is configured to receive a request message from the terminal before the sending module 30 sends the resource allocation parameter to the terminal. The request message is used for requesting the base station to allocate the resource allocation parameter to the terminal.

Optionally, the resource allocation parameter further includes bandwidth indication information. The bandwidth indication information is used for indicating bandwidth information of the resource position.

Optionally, when the bandwidth indication information has 1 bit, the bandwidth indication information indicates whether the resource position is a wideband or a narrowband, and when the bandwidth indication information has 2 bits, the bandwidth indication information indicates the number of narrowbands included in a bandwidth of the resource position.

Optionally, the starting narrowband index is used for one of the followings: indicating starting position information of the resource position of the wideband; identifying a wideband index of the wideband, where the wideband includes a staring narrowband and the starting narrowband has a minimum index among narrowbands within the wideband; identifying a narrowband index.

FIG. 4 is a structural diagram of another resource allocation device according to an embodiment of the present invention, applied to a terminal which may specifically be an MTC terminal. As shown in FIG. 4, the device includes a receiving module 40.

The receiving module 40 is configured to receive a resource allocation parameter, where the resource allocation parameter includes a starting narrowband index and a resource position, and the starting narrowband index is used for indicating a narrowband resource and/or a wideband resource for establishing a physical shared channel.

Optionally, the device may further include an establishment module 42. The establishment module 42 is configured to establish the physical shared channel according to at least the starting narrowband index and the resource position. The terminal receives a downlink shared channel on the PRBs determined by the resource allocation parameter, and the terminal sends an uplink shared channel on the PRBs determined by the resource allocation parameter.

Optionally, the resource allocation parameter further includes bandwidth indication information. The bandwidth indication information is used for indicating bandwidth information of the resource position.

Optionally, when the bandwidth indication information has 1 bit, the bandwidth indication information indicates whether the resource position is a wideband or a narrowband, and when the bandwidth indication information has 2 bits, the bandwidth indication information indicates the number of narrowbands included in a bandwidth of the resource position.

Optionally, the wideband includes M narrowbands, where M is an integer greater than or equal to 2 and less than or equal to 16; and the narrowband includes at least six continuous physical resource blocks (PRBs).

Optionally, a maximum channel bandwidth supported by the physical shared channel includes one of 5 MHz, 10 MHz and 20 MHz.

Optionally, when the wideband has a bandwidth of 5 MHz, the wideband includes 24 or 25 PRBs.

Optionally, the starting narrowband index may be specifically used for one of the followings: indicating starting position information of the resource position; identifying a wideband index of the wideband, where the wideband includes a staring narrowband and the starting narrowband has a minimum index among narrowbands within the wideband; identifying a narrowband index.

It is to be noted that the various modules described above may be implemented by software or hardware. Implementation by hardware may, but may not necessarily, be performed in the following manner: the various modules described above are located in a same processor, or the various modules described above are located in their respective processors in any combination form.

Embodiment 3

The embodiment is an optional embodiment of the present invention, used for describing the present application in detail in conjunction with different examples and scenarios. The embodiment includes a plurality of specific embodiments.

Specific Embodiment 1

Figure 5:
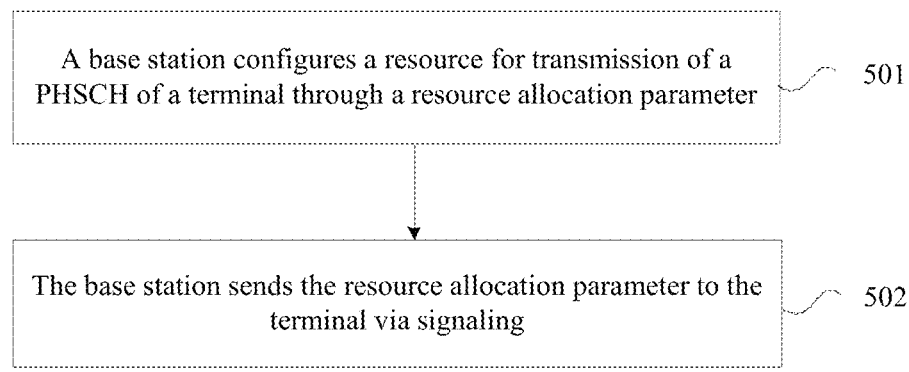
FIG. 5 is a flowchart of a resource allocation method according to an embodiment 3 of the present invention.
Figure 6A:
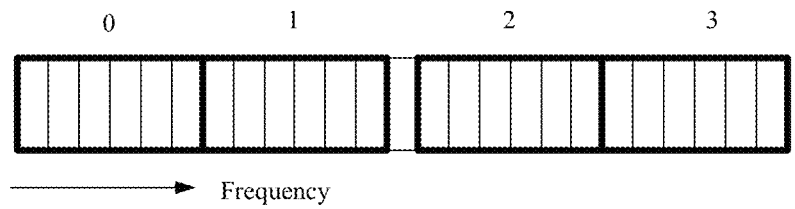
FIG. 6(a) to FIG. 6(d) are schematic diagrams of an MTC narrowband defined when a system bandwidth is 5/10/15/20 MHz in 3GPP LTE in existing art.
Figure 6B:
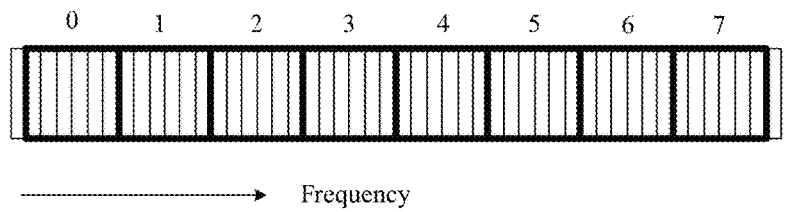
Figure 6C:
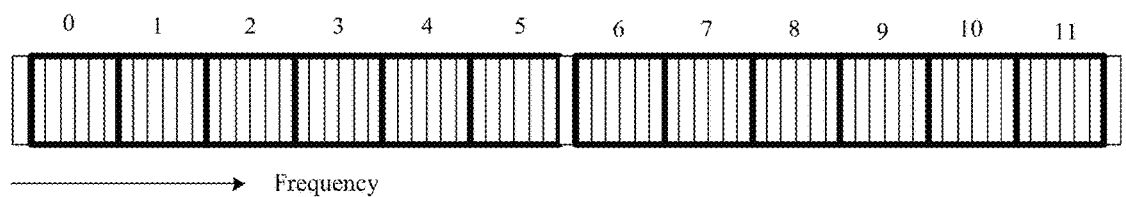
Figure 6D:
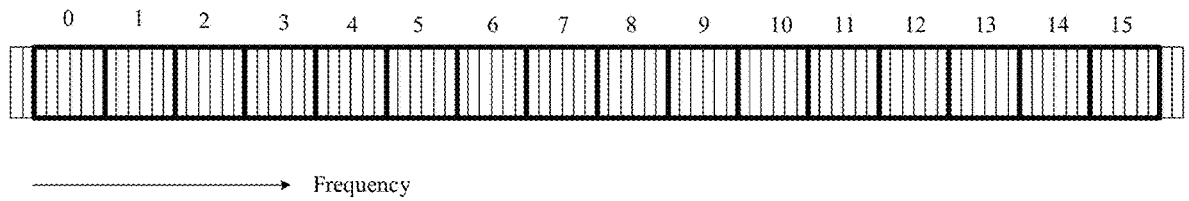

The embodiment provides a resource allocation method. FIG. 5 is a flowchart of a resource allocation method according to an embodiment 3 of the present invention. FIG. 5 shows a flow of the resource allocation method according to the embodiment of the present invention. The method includes the steps described below.

In step S501, a base station configures a resource for transmission of a physical shared channel of a terminal through a resource allocation parameter.

In step S502, the base station sends the resource allocation parameter to the terminal via signaling.

The resource allocation parameter includes a starting narrowband index and a resource position within a wideband. The wideband has a maximum bandwidth of a PDSCH/PUSCH supported by the terminal. In the embodiment, a maximum channel bandwidth of the wideband is 5 MHz and the wideband includes an integer multiple of narrowbands. Specifically, the wideband includes 4 narrowbands and has a size of 24 or 25 PRBs. The base station sends the starting narrowband index to the terminal through DCI. FIG. 6(a) to FIG. 6(d) are respective schematic diagrams of an MTC narrowband defined when a system bandwidth is 5/10/15/20 MHz in the 3GPP LTE in existing art.

$$x = \left\lceil \log_2\left(\left\lfloor \frac{N_{RB}^{DL}}{6} \right\rfloor - 3\right) \right\rceil N_{RB}^{DL}$$

Figure 7:
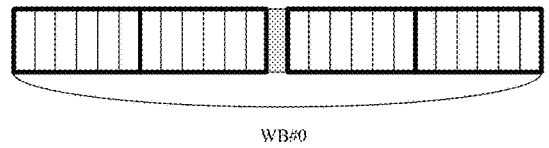
FIG. 7 is a schematic diagram of a wideband division under a system bandwidth of 5 MHz according to an embodiment of the present invention.

FIG. 7 is a schematic diagram of a wideband division under a system bandwidth of 5 MHz according to an embodiment of the present invention. As shown in FIG. 7, for the system bandwidth of 5 MHz, since only one possible bandwidth position of the PDSCH/PUSCH of the wideband is included, it is unnecessary to send the starting narrowband index to the terminal to indicate wideband information.

Figure 8A:
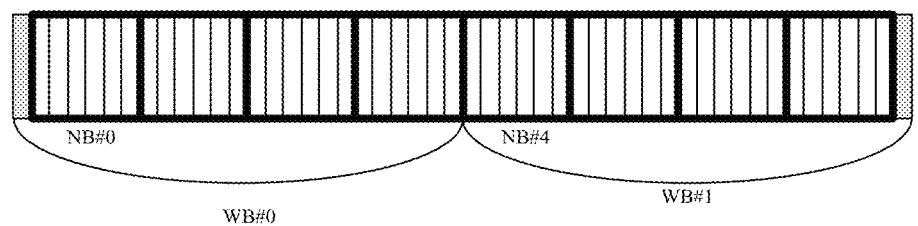
FIG. 8(a) to FIG. 8(c) are schematic diagrams of a wideband division under a system bandwidth of 10 MHz according to an embodiment of the present invention.
Figure 8B:
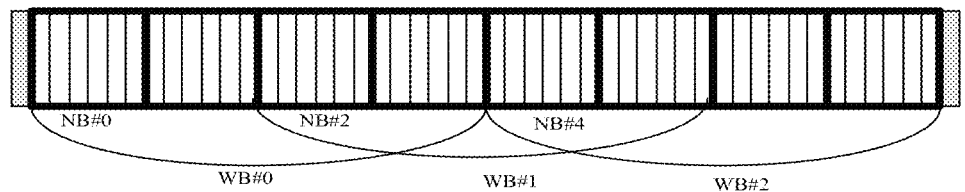
Figure 8C:
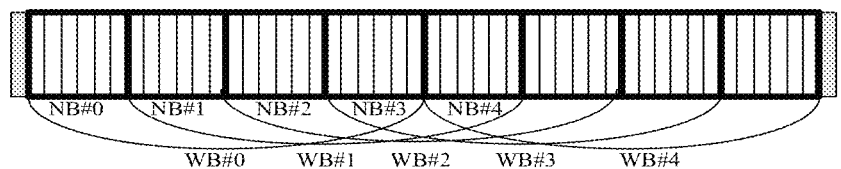

FIG. 8(a) to FIG. 8(c) are schematic diagrams of a wideband division under a system bandwidth of 10 MHz according to an embodiment of the present invention. FIG. 8(a) to FIG. 8(c) correspond to three wideband divisions respectively in which the 10 MHz bandwidth is divided into 2, 3 or 5 widebands. As shown in FIG. 8(a) to FIG. 8(c), for the system bandwidth of 10 MHz, since 2 to 5 possible bandwidth positions of the PDSCH/PUSCH of the wideband might be included, a maximum value of the starting narrowband index is narrowband #4. In this case, 3 bits are required to send the starting narrowband index to the terminal to indicate information on PDSCH/PUSCH bandwidths of the wideband.

Figure 9A:
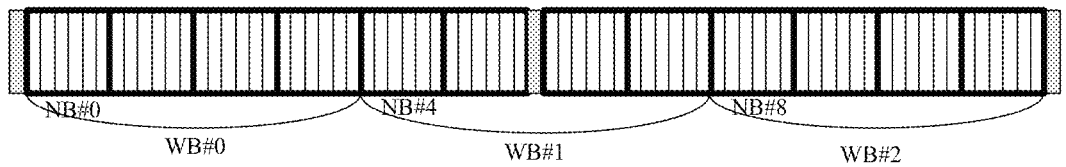
FIG. 9(a) and FIG. 9(b) are schematic diagrams of a wideband division under a system bandwidth of 15 MHz according to an embodiment of the present invention.
Figure 9B:
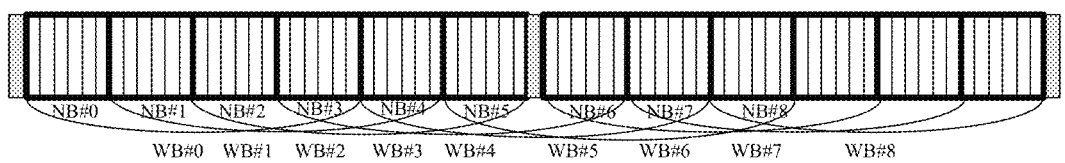

FIG. 9(a) and FIG. 9(b) are schematic diagrams of a wideband division under a system bandwidth of 15 MHz according to an embodiment of the present invention. For the 15 MHz bandwidth, FIG. 9(a) and FIG. 9(b) show two wideband divisions respectively. As shown in FIG. 9(a) and FIG. 9(b), for the system bandwidth of 15 MHz, since 3 to 9 possible bandwidth positions of the PDSCH/PUSCH of the wideband might be included, the maximum value of the starting narrowband index is narrowband #8. In this case, 4 bits are required to send the starting narrowband index to the terminal to indicate the information on the PDSCH/PUSCH bandwidths of the wideband.

Figure 10A:
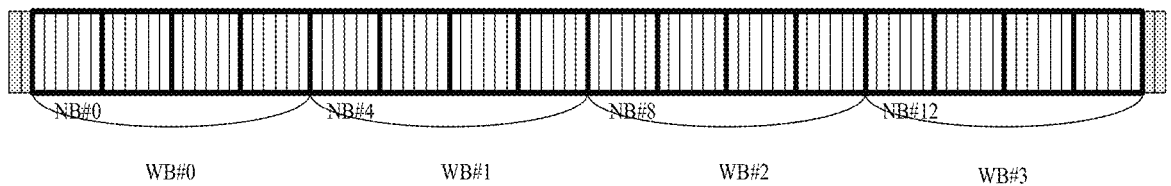
FIG. 10(a) and FIG. 10(b) are schematic diagrams of a wideband division under a system bandwidth of 20 MHz according to an embodiment of the present invention.
Figure 10B:
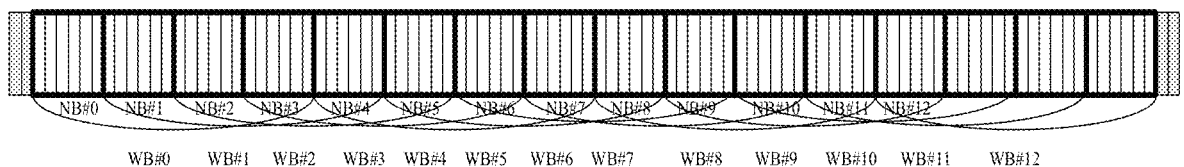

FIG. 10(a) and FIG. 10(b) are schematic diagrams of a wideband division under a system bandwidth of 20 MHz according to an embodiment of the present invention. For the 20 MHz bandwidth, FIG. 10(a) and FIG. 10(b) show two wideband divisions respectively. As shown in FIG. 10(a) and FIG. 10(b), for the system bandwidth of 20 MHz, since 4 to 13 possible bandwidth positions of the PDSCH/PUSCH of the wideband might be included, the maximum value of the starting narrowband index is narrowband #12. In this case, 4 bits are required to send the starting narrowband index to the terminal to indicate the information on the PDSCH/PUSCH bandwidths of the wideband.

The base station sends a resource location within the wideband to the terminal through the DCI. Resource granularity indicating the resource position within the wideband is at least one of: 1 PRB, 2 PRBs, 3 PRBs, 4 PRBs and 6 PRBs.

The resource position may be directly indicated by a specific resource indication field, or jointly indicated by a resource allocation manner indication field and the specific resource indication field.

In response to that the resource position is indicated by the specific resource indication field, a resource allocation manner corresponding to the specific resource indication field is pre-defined or fixed or semi-statically configured.

In response to that the resource position is jointly indicated by the resource allocation manner indication field and the specific resource indication field, the resource allocation manner corresponding to the specific resource indication field is determined by the resource allocation manner indication field.

Furthermore, the starting narrowband index and the resource position in the DCI are separately indicated and independently encoded.

Specific Embodiment 2

The embodiment provides a resource allocation method which has a same flow as that in the specific embodiment 1. The flow includes the steps described below.

In step S501, a base station configures a resource for transmission of a physical shared channel of a terminal through a resource allocation parameter.

In step S502, the base station sends the resource allocation parameter to the terminal via signaling.

The resource allocation parameter includes at least one of a starting narrowband index, bandwidth indication information and a resource position. A wideband has a maximum bandwidth of a PDSCH/PUSCH supported by the terminal. In the embodiment, a maximum channel bandwidth of the wideband is 5 MHz and the wideband includes an integer multiple of narrowbands. Specifically, the wideband includes 4 narrowbands and has a size of 24 or 25 PRBs.

When the bandwidth indication information has 1 bit, the base station sends the bandwidth indication information to the terminal through DCI. Table 1 illustrates a meaning when the bandwidth indication information has 1 bit.

TABLE 1

| Field Name | Number of Bits | Meaning |
| --- | --- | --- |
| Bandwidth indication information | 1 | 1: Wideband 0: Narrowband |

TABLE 1-continued

| Field Name | Number of Bits | Meaning |
|---|---|---|
| | | $x = \left\lceil \log_2\left(\left\lfloor \frac{N_{RB}^{DL}}{6} \right\rfloor - 3\right) N_{RB}^{DL} \right\rceil$ |
| | | $y = \left\lceil \log_2\left(\left\lfloor \frac{N_{RB}^{DL}}{6} \right\rfloor\right) \right\rceil$ |

The base station sends the resource location to the terminal through the DCI. If the bandwidth indication information indicates that the resource position is the wideband, the resource position sent to the terminal is the resource position within the wideband. If the bandwidth indication information indicates that the resource position is the narrowband, the resource position sent to the terminal is the resource position within the narrowband.

The resource position may be directly indicated by a specific resource indication field, or jointly indicated by a resource allocation manner indication field and the specific resource indication field.

In response to that the resource position is indicated by the specific resource indication field, a resource allocation manner corresponding to the specific resource indication field is pre-defined or fixed or semi-statically configured.

In response to that the resource position is jointly indicated by the resource allocation manner indication field and the specific resource indication field, the resource allocation manner corresponding to the specific resource indication field is determined by the resource allocation manner indication field.

Resource granularity indicating the resource position within the wideband or the narrowband is at least one of: 1 PRB, 2 PRBs, 3 PRBs, 4 PRBs and 6 PRBs.

Furthermore, the starting narrowband index and the resource position in the DCI are separately indicated and independently encoded.

Specific Embodiment 3

The embodiment provides a resource allocation method which has a same flow as that in the specific embodiment 1. The flow includes the steps described below.

In step S501, a base station configures a resource for transmission of a physical shared channel of a terminal through a resource allocation parameter.

In step S502, the base station sends the resource allocation parameter to the terminal via signaling.

The resource allocation parameter includes at least one of a starting narrowband index, bandwidth indication information and a resource position. A wideband has a maximum bandwidth of a PDSCH/PUSCH supported by the terminal. In the embodiment, a maximum channel bandwidth of the wideband is 5 MHz and the wideband includes an integer multiple of narrowbands. Specifically, the wideband includes 4 narrowbands and has a size of 24 or 25 PRBs.

When the bandwidth indication information has 1 bit or 2 bits, the base station sends the bandwidth indication information to the terminal through DCI. Table 2 illustrates meanings when the bandwidth indication information has 1 bit and 2 bits.

TABLE 2

| Field Name | Number of Bits | Meaning |
|---|---|---|
| Bandwidth indication | 1 | 1: Wideband<br>0: Narrowband |
| Bandwidth indication | 2 | 00: Narrowband<br>01: Wideband including 2 narrowbands<br>10: Wideband including 3 narrowbands<br>11: Wideband including 4 narrowbands |

For a system bandwidth greater than or equal to 5 MHz, if the bandwidth indication information indicates that a bandwidth of the resource position is the wideband, the starting narrowband index identifies the wideband.

If the starting narrowband index is used for identifying the narrowband, the starting narrowband index identifies the narrowband.

The base station sends the resource location to the terminal through the DCI. If the bandwidth indication information indicates that the resource position is the wideband, the resource position sent to the terminal is the resource position within the wideband. If the bandwidth indication information indicates that the resource position is the narrowband, the resource position sent to the terminal is the resource position within the narrowband.

Resource granularity indicating the resource position within the wideband or the narrowband is at least one of: 1 PRB, 2 PRBs, 3 PRBs, 4 PRBs and 6 PRBs.

Furthermore, the starting narrowband index and the bandwidth indication information in the DCI are indicated with a bitmap of length N1 and jointly encoded. Taking a 10 MHz bandwidth in FIG. 8(c) as an example, N1=5, as shown in table 3.

TABLE 3

| Field Name | Number of Bits | Meaning | |
|---|---|---|---|
| Joint Information field of starting narrowband index and bandwidth indication | 5 | 00000 | NB#0 |
| | | 00001 | Wideband including NB#0 and NB#1 |
| | | 00010 | Wideband including NB#0, NB#1 and NB#2 |
| | | 00011 | WB#0 |
| | | 00100 | NB#1 |
| | | 00101 | Wideband including NB#1 and NB#2 |
| | | 00110 | Wideband including NB#1, NB#2 and NB#3 |
| | | 00111 | WB#1 |
| | | 01000 | NB#2 |
| | | 01001 | Wideband including NB#2 and NB#3 |
| | | 01010 | Wideband including NB#2, NB#3 and NB#4 |
| | | 01011 | WB#2 |
| | | 01100 | NB#3 |
| | | 01101 | Wideband including NB#3 and NB#4 |
| | | 01110 | Wideband including NB#3, NB#4 and NB#5 |
| | | 01111 | WB#3 |
| | | 10000 | NB#4 |
| | | 10001 | Wideband including NB#4 and NB#4 |
| | | 10010 | Wideband including NB#4, NB#5 and NB#6 |
| | | 10011 | WB#4 |

The base station sends the resource location to the terminal through the DCI. The resource position is sent with a bitmap of length N2. With respect to different narrowbands and widebands in the above table, the resource granularity indicating the resource position within the wideband or the narrowband is 1 PRB, 2 PRBs, 3 PRBs, 4 PRBs and 6 PRBs respectively. Specifically, the resource granularity indicating the resource location within the narrowband is 1 PRB, the resource granularity indicating the resource location within the wideband including two adjacent narrowbands is 2 PRBs, the resource granularity indicating the resource location within the wideband including three adjacent narrowbands is 3 PRBs, the resource granularity indicating the resource location within the wideband including four adjacent narrowbands is 4 PRBs, and the resource granularity indicating the resource location within the wideband including four adjacent narrowbands is 6 PRBs.

Specific Embodiment 4

The embodiment provides a resource allocation method which has a same flow as that in the specific embodiment 1. The flow includes the steps described below.

In step S501, a base station configures a resource for transmission of a physical shared channel of a terminal through a resource allocation parameter.

In step S502, the base station sends the resource allocation parameter to the terminal via signaling.

The resource allocation parameter includes at least a starting narrowband index and a resource position. The base station sends the starting narrowband index and resource position information to the terminal through DCI. The starting narrowband index and the resource position information are jointly indicated, characterized by joint encoding.

The base station sends the starting narrowband index and the resource position information to the terminal through a bitmap of length N subject to the joint encoding.

The bitmap of length N represents one of the following resource allocation parameters:

wideband information (a wideband index) and the resource position information within a wideband, that is, resource allocation information within a certain wideband (5 MHz); where the wideband has a maximum bandwidth of a PDSCH/PUSCH supported by the terminal; in the embodiment, the wideband has a bandwidth of 5 MHz and the wideband includes an integer multiple of narrowbands; specifically, the wideband includes 4 narrowbands and has a size of 24 or 25 physical resource blocks (PRBs); and a narrowband index and the resource position information within a narrowband, that is, resource allocation information within a certain narrowband (1.4 MHz). Table 4 shows a meaning when the number of bits is 10.

TABLE 4

| Field Name | Number of Bits | | Meaning |
|---|---|---|---|
| Joint information field of starting narrowband index and resource position | 10 | 0000000001~ 0000111111 | Bitmap allocation of the resource position in NB#0 |
| | | 0001000001~ 0001111111 | Bitmap allocation of the resource position in NB#1 |
| | | 0010000001~ 0010111111 | Bitmap allocation of the resource position in NB#2 |
| | | 0011000001~ 0011111111 | Bitmap allocation of the resource position in NB#3 |
| | | 0100000001~ 000111111 | Bitmap allocation of the resource position in NB#4 |
| | | 0101000001~ 0101111111 | Bitmap allocation of the resource position in NB#5 |
| | | 0110000001~ 0110111111 | Bitmap allocation of the resource position in NB#6 |
| | | 0111000001~ 0111111111 | Bitmap allocation of the resource position in NB#7 |
| | | 1000000001~ 1000111111 | Bitmap allocation of the resource position in WB#0 |
| | | 1001000001~ | Bitmap allocation of the |

TABLE 4-continued

| Field Name | Number of Bits | | Meaning |
|---|---|---|---|
| | | 1001111111 | resource position in WB#1 |
| | | 1010000001~ 10101111111 | Bitmap allocation of the resource position in WB#2 |
| | | 1011000001~ 10111111111 | Bitmap allocation of the resource position in WB#3 |
| | | 1011000001~ 10111111111 | Bitmap allocation of the resource position in WB#4 |

The present invention provides a resource allocation method and device to solve the problem in existing art that resource allocation for PDSCH/PUSCH only considers a bandwidth limitation of a 1.4 MHz narrowband so that a terminal cannot support an MTC application with a higher data rate.

Specific Embodiment 5

The embodiment provides a resource allocation method which has a same flow as that in the specific embodiment 1. The flow includes the steps described below.

In step S501, a base station configures a resource for transmission of a physical shared channel of a terminal through a resource allocation parameter.

In step S502, the base station sends the resource allocation parameter to the terminal via signaling.

The resource allocation parameter includes at least a starting narrowband index and a resource position. The base station sends the starting narrowband index and resource position information to the terminal through DCI. The starting narrowband index is independently encoded.

Specific PRB position information is sent to the terminal with a bitmap of length N1 by the resource position information to represent one of the following resource allocation parameters:

a resource block with a resource size of 1 PRB;
a resource block with a resource size of 2 PRBs;
a resource block with a resource size of 3 PRBs;
a resource block with a resource size of 6 PRBs;
a resource block with a resource size of 12 PRBs; and
a resource block with a resource size of 24 PRBs.

Table 5 shows a meaning when the number of bits N1 is equal to 6.

TABLE 5

| Field Name | Number of Bits | | Meaning |
|---|---|---|---|
| Resource position information field | 6 | 0~23 | Each corresponds to a certain PRB in a wideband; for example, 0 corresponds to PRB#0 in the wideband (24 valid PRBs in the wideband are ordered and invalid PRBs are excluded) |
| | | 24~31 | Each corresponds to 3 PRBs within a certain narrowband in the wideband. For example, 24 corresponds to first 3 PRBs of a first narrowband in the wideband and so on. |
| | | 32~35 | Each corresponds to a certain narrowband in the wideband. For example, 32 corresponds to a first narrowband in the wideband and so on. |
| | | 36~38 | Each corresponds to 12 continuous PRBs, two continuous |

TABLE 5-continued

| Field Name | Number of Bits | Meaning |
|---|---|---|
| | | narrowbands, in the wideband. 36 corresponds to a narrowband 0 and a narrowband 1. 37 corresponds to the narrowband 1 and a narrowband 2. 38 corresponds to the narrowband 2 and a narrowband 3. |
| | 39 | 39 corresponds to 24 valid PRBs within the wideband. |
| | 40~65 | Reserved (These numerals may be considered as other allocation granularity; for example, 40 to 51 identify two continuous PRBs within the wideband, where 40 corresponds to PRB0 and PRB1 and so on.) |

Specific Embodiment 6

The embodiment provides a resource allocation method which has a same flow as that in the specific embodiment 1. The flow includes the steps described below.

In step S501, a base station configures a resource for transmission of a physical shared channel of a terminal through a resource allocation parameter.

In step S502, the base station sends the resource allocation parameter to the terminal via signaling.

The resource allocation parameter includes at least a starting narrowband index, a bandwidth indication and a resource position. The base station sends the starting narrowband index, the bandwidth indication and resource position information to the terminal through DCI. The starting narrowband index is independently encoded and identifies a narrowband index or a wideband index.

Specific PRB position information is sent to the terminal with a bitmap of length N2 by the bandwidth indication and the resource position information to represent one of the following resource allocation parameters:

resource allocation within a narrowband, where the resource allocation is performed on any continuous PRBs within the narrowband; and resource allocation within a wideband, which is performed with resource allocation granularity of 6 PRBs and 3 PRBs.

Table 6 shows a meaning when the number of bits N2 is equal to 6.

TABLE 6

| Field Name | Number of Bits | | Meaning |
|---|---|---|---|
| Bandwidth indication and resource position information field | 6 | 0XXXXX XXXXX = 00000~11111 | Continuous resource allocation within the narrowband corresponding to the starting narrowband index |
| | | 10XXXX XXXX = 0000~1111 | Resource allocation with granularity of a narrowband (6 PRBs) within the wideband corresponding to the starting narrowband index 10XXXX: A bitmap of last 4 bits identifies an allocation combination of any narrowbands within the wideband; for example, 1010 indicates that a narrowband 1 and a narrowband |

TABLE 6-continued

| Field Name | Number of Bits | | Meaning |
|---|---|---|---|
| | | | 3 are allocated. |
| | | 110XXX XXX = 000-111 | Resource allocation with resource granularity of half the narrowband (3 PRBs) within the wideband, where the 3 PRBs correspond to PRB#0~#2 or PRB#3~#5, and each numeral corresponds to a resource size of half the narrowband. |
| | | 1110XX | X = 00 corresponds to two discontinuous half of the narrowband (PRB#0~#2 within the narrowband) on a narrowband 0 and a narrowband 2 in the wideband. X = 10 corresponds to two discontinuous half of the narrowband (PRB#3~#5 within the narrowband) on the narrowband 0 and the narrowband 2 in the wideband. X = 00 corresponds to two discontinuous half of the narrowband (PRB#0~#2 within the narrowband) on a narrowband 1 and a narrowband 3 in the wideband. X = 01 corresponds to two discontinuous half of the narrowband (PRB#3~#5 within the narrowband) on the narrowband 1 and the narrowband 3 in the wideband. |
| | | 11110X | X = 0 corresponds to four discontinuous half of the narrowband (PRB#0~#2 within the narrowband) on narrowbands 0, 1, 2 and 3 in the wideband. X = 1 corresponds to four discontinuous half of the narrowband (PRB#3~#3 within the narrowband) on the narrowbands 0, 1, 2 and 3 in the wideband |
| | | 11111X | Reserved |

Specific Embodiment 7

The embodiment provides a resource allocation method which has a same flow as that in the specific embodiment 1. The flow includes the steps described below.

In step S501, a base station configures a resource for transmission of a physical shared channel of a terminal through a resource allocation parameter.

In step S502, the base station sends the resource allocation parameter to the terminal via signaling.

The resource allocation parameter includes at least a starting narrowband index, a bandwidth indication and a resource position. The base station sends the starting narrowband index, the bandwidth indication and resource position information to the terminal through DCI. The starting narrowband index is independently encoded and identifies a narrowband index or a wideband index.

Resource allocation information is sent to the terminal with a bitmap of length N3 by the bandwidth indication and the resource position information to represent one of the following resource allocation parameters:

resource allocation within a narrowband, where a resource allocation manner is a narrowband bitmap of 4 narrowbands within the wideband plus PRB resource allocation within the narrowband. If the narrowband bitmap is 1001, it indicates that the resource allocation corresponds to a narrowband 0 and a narrowband 3. The resource allocation within the narrowband corresponds to resource allocation on the narrowband bitmap. The PRB resource allocation is the same within all narrowbands on a bitmap 1.

resource allocation within a narrowband, which directly indicates the resource allocation of any continuous PRBs within the wideband.

Table 7 shows a meaning when the number of bits N3 is equal to 10.

TABLE 7

| Field Name | Number of Bits | | Meaning |
|---|---|---|---|
| Bandwidth indication and resource position information field | 10 | 0YYYYXXXXX | YYYY is the narrowband bitmap XXXXX is continuous resource allocation within the narrowband. |
| | | 1XXXXXXXXX | XXXXXXXXX is continuous resource allocation within the wideband |

Embodiment 4

An embodiment of the present invention further provides a storage medium. Optionally, in the embodiment, the storage medium may be configured to store program codes for executing the step described below.

In S1, a resource allocation parameter is sent to a terminal via signaling. The resource allocation parameter includes a starting narrowband index and a resource position. The starting narrowband index is used for indicating a narrowband resource and/or a wideband resource for the terminal to establish a physical shared channel.

Optionally, in the embodiment, the storage medium described above may include, but is not limited to, a USB flash drive, a ROM, a RAM, a mobile hard disk, a magnetic disk, an optical disk or another medium capable of storing the program codes.

Optionally, in the embodiment, a processor executes, according to the program codes stored in the storage medium, the following step: a resource allocation parameter is sent to a terminal via signaling. The resource allocation parameter includes a starting narrowband index and a resource position. The starting narrowband index is used for indicating a narrowband resource and/or a wideband resource for the terminal to establish a physical shared channel.

Apparently, it should be understood by those skilled in the art that each of the above-mentioned modules or steps of the present invention may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present invention is not limited to any specific combination of hardware and software.

The above are only preferred embodiments of the present invention and are not intended to limit the present invention. For those skilled in the art, the present invention may have various modifications and variations. Any modifications, equivalent substitutions, improvements and the like made within the spirit and principle of the present invention should fall within the scope of the present invention.

INDUSTRIAL APPLICABILITY

As described above, the resource allocation method and device provided by the embodiments of the present invention have the following beneficial effects: the base station configures the resource for the transmission of the physical shared channel of the terminal through the resource allocation parameter and sends the resource allocation parameter to the terminal, thereby solving the problem in existing art that resource allocation for PDSCH/PUSCH only considers a bandwidth limitation of a 1.4 MHz narrowband so that a UE cannot support MTC applications with a higher data rate and achieving an effect of being capable of supporting MTC traffic with a higher data rate.

The invention claimed is:

1. A wireless communication method, comprising:
sending, by a base station, a starting narrowband index, a bandwidth indication information, and a resource position,
wherein the starting narrowband index identifies a wideband resource for a terminal in response to the bandwidth indication information indicating that a bandwidth of the resource position is wideband,
wherein the starting narrowband index indicates a narrowband resource in response to the starting narrowband index being used to identify a narrowband,
wherein the resource position indicates one or more physical resource blocks (PRBs) within the narrowband resource or the wideband resource,
wherein the starting narrowband index and the bandwidth indication information are jointly encoded and sent with a bitmap of length N1, wherein N1 is a positive integer,
wherein the starting narrowband index and the bandwidth indication information are jointly encoded using a table that includes a plurality of values,
wherein a first value identifies one narrowband resource,
wherein a second value identifies a wideband that is associated with a set of narrowband resources, and
wherein a third value identifies one wideband resource; and
receiving, by the base station, a physical shared channel on a set of PRBs based on the starting narrowband index, the bandwidth indication information, and the resource position.

2. The method of claim 1, wherein the wideband resource includes a plurality of narrowband resources, and wherein each narrowband resource includes a plurality of PRBs.

3. The method of claim 1, wherein a system bandwidth includes a plurality of widebands, wherein the plurality of widebands includes the wideband resource that comprises a first set of narrowband resources, wherein the plurality of widebands includes a second wideband resource that comprises a second set of narrowband resources.

4. The method of claim 3, wherein the wideband resource is adjacent to the second wideband resource in frequency domain such that the first set of narrowband resources and the second set of narrowband resources do not overlap.

5. The method of claim 3, wherein the wideband resource overlaps with the second wideband resource in frequency domain such that at least some narrowband resources from the first set of narrowband resources overlap with at least some narrowband resources from the second set of narrowband resources.

6. The method of claim 1, wherein the starting narrowband index identifies the wideband resource for the terminal in response to the bandwidth indication information indicating that the bandwidth of the resource position is wideband and in response to a system bandwidth being greater than or equal to a frequency value.

7. A wireless communication method, comprising:
receiving, by a terminal, a starting narrowband index, a bandwidth indication information, and a resource position,
wherein the starting narrowband index identifies a wideband resource for the terminal in response to the bandwidth indication information indicating that a bandwidth of the resource position is wideband,
wherein the starting narrowband index indicates a narrowband resource in response to the starting narrowband index being used to identify a narrowband,
wherein the resource position indicates one or more physical resource blocks (PRBs) within the narrowband resource or the wideband resource,
wherein the starting narrowband index is jointly encoded with the bandwidth indication information and received with a bitmap of length N1, wherein N1 is a positive integer,
wherein the starting narrowband index is jointly encoded with the bandwidth indication information based on a table that includes a plurality of values,
wherein a first value identifies one narrowband resource,
wherein a second value identifies a wideband that is associated with a set of narrowband resources, and
wherein a third value identifies one wideband resource; and
transmitting, by the terminal, a physical shared channel on a set of PRBs based on the starting narrowband index, the bandwidth indication information, and the resource position.

8. The method of claim 7, wherein the wideband resource includes a plurality of narrowband resources, and wherein each narrowband resource includes a plurality of PRBs.

9. The method of claim 7, wherein a system bandwidth includes a plurality of widebands, wherein the plurality of widebands includes the wideband resource that comprises a first set of narrowband resources, wherein the plurality of widebands includes a second wideband resource that comprises a second set of narrowband resources.

10. The method of claim 9, wherein the wideband resource is adjacent to the second wideband resource in frequency domain such that the first set of narrowband resources and the second set of narrowband resources do not overlap.

11. The method of claim 9, wherein the wideband resource overlaps with the second wideband resource in frequency domain such that at least some narrowband resources from the first set of narrowband resources overlap with at least some narrowband resources from the second set of narrowband resources.

12. The method of claim 7, wherein the starting narrowband index identifies the wideband resource for the terminal in response to the bandwidth indication information indicating that the bandwidth of the resource position is wideband and in response to a system bandwidth being greater than or equal to a frequency value.

13. A wireless apparatus, comprising:
at least one processor; and
at least one memory including executable code that when executed by the at least one processor configures the at least processor to perform a method, comprising:
sending a starting narrowband index, a bandwidth indication information, and a resource position,
wherein the starting narrowband index identifies a wideband resource for a terminal in response to the bandwidth indication information indicating that a bandwidth of the resource position is wideband,
wherein the starting narrowband index indicates a narrowband resource in response to the starting narrowband index being used to identify a narrowband,
wherein the resource position indicates one or more physical resource blocks (PRBs) within the narrowband resource or the wideband resource,
wherein the starting narrowband index and the bandwidth indication information are jointly encoded and sent with a bitmap of length N1, wherein N1 is a positive integer,
wherein the starting narrowband index and the bandwidth indication information are jointly encoded using a table that includes a plurality of values,
wherein a first value identifies one narrowband resource,
wherein a second value identifies a wideband that is associated with a set of narrowband resources, and
wherein a third value identifies one wideband resource; and
receiving a physical shared channel on a set of PRBs based on the starting narrowband index, the bandwidth indication information, and the resource position.

14. The wireless apparatus of claim 13, wherein the wideband resource includes a plurality of narrowband resources, and wherein each narrowband resource includes a plurality of PRBs.

15. The wireless apparatus of claim 13, wherein a system bandwidth includes a plurality of widebands, wherein the plurality of widebands includes the wideband resource that comprises a first set of narrowband resources, wherein the plurality of widebands includes a second wideband resource that comprises a second set of narrowband resources.

16. The wireless apparatus of claim 13, wherein the starting narrowband index identifies the wideband resource for the terminal in response to the bandwidth indication information indicating that the bandwidth of the resource position is wideband and in response to a system bandwidth being greater than or equal to a frequency value.

17. A wireless apparatus, comprising:
at least one processor; and
at least one memory including executable code that when executed by the at least one processor configures the at least processor to perform a method, comprising:
receiving a starting narrowband index, a bandwidth indication information, and a resource position, wherein the starting narrowband index identifies a wideband resource for a terminal in response to the bandwidth indication information indicating that a bandwidth of the resource position is wideband, wherein the starting narrowband index indicates a narrowband resource in response to the starting narrowband index being used to identify a narrowband, wherein the resource position indicates one or more physical resource blocks (PRBs) within the narrowband resource or the wideband resource, wherein the starting narrowband index is jointly encoded with the bandwidth indication information and received with a bitmap of length N1, wherein N1 is a positive integer, wherein the starting narrowband index is jointly encoded with the bandwidth indication information based on a table that includes a plurality of values, wherein a first value identifies one narrowband resource, wherein a second value identifies a wideband that is associated with a set of narrowband resources, and wherein a third value identifies one wideband resource; and transmitting a physical shared channel on a set of PRBs based on the starting narrowband index, the bandwidth indication information, and the resource position.

18. The wireless apparatus of claim 17, wherein the wideband resource includes a plurality of narrowband resources, and wherein each narrowband resource includes a plurality of PRBs.

19. The wireless apparatus of claim 17, wherein a system bandwidth includes a plurality of widebands, wherein the plurality of widebands includes the wideband resource that comprises a first set of narrowband resources, wherein the plurality of widebands includes a second wideband resource that comprises a second set of narrowband resources.

20. The wireless apparatus of claim 17, wherein the starting narrowband index identifies the wideband resource for the terminal in response to the bandwidth indication information indicating that the bandwidth of the resource position is wideband and in response to a system bandwidth being greater than or equal to a frequency value.

* * * * *